(12) United States Patent
Senoo et al.

(10) Patent No.: US 7,260,437 B2
(45) Date of Patent: Aug. 21, 2007

(54) NETWORK SYSTEM USING MANAGEMENT FRAMES FOR SUPERVISING CONTROL UNITS

(75) Inventors: Shinichi Senoo, Kariya (JP); Tomohisa Kishigami, Obu (JP); Hajime Kikkawa, Nagoya (JP)

(73) Assignee: DENSO Corporation, Kariya (JP)

( * ) Notice: Subject to any disclaimer, the term of this patent is extended or adjusted under 35 U.S.C. 154(b) by 1000 days.

(21) Appl. No.: 10/242,616

(22) Filed: Sep. 13, 2002

(65) Prior Publication Data

US 2003/0055942 A1 Mar. 20, 2003

(30) Foreign Application Priority Data

Sep. 18, 2001 (JP) ............................. 2001-283258

(51) Int. Cl.
*G05B 15/02* (2006.01)
*G06F 7/00* (2006.01)
*G06F 15/16* (2006.01)
*G06F 15/713* (2006.01)
*H04L 12/28* (2006.01)
*G01R 31/08* (2006.01)

(52) U.S. Cl. ............................. 700/9; 701/36; 709/200; 709/236; 709/238; 709/252; 370/251; 370/254; 370/258; 700/19

(58) Field of Classification Search .................. 700/19, 700/9; 701/36; 709/200, 236, 238, 252; 370/251, 254, 258

See application file for complete search history.

(56) References Cited

U.S. PATENT DOCUMENTS

| | | | | | |
|---|---|---|---|---|---|
| 5,274,638 | A | * | 12/1993 | Michihira et al. | 370/245 |
| 5,289,466 | A | * | 2/1994 | Nobutoki et al. | 370/461 |
| 5,343,472 | A | * | 8/1994 | Michihira et al. | 370/445 |
| 5,606,556 | A | * | 2/1997 | Kawanishi et al. | 370/471 |
| 5,757,773 | A | * | 5/1998 | Tsuji | 370/241 |
| 5,856,976 | A | * | 1/1999 | Hirano | 370/401 |
| 5,859,845 | A | * | 1/1999 | Oniishi et al. | 370/386 |
| 6,477,140 | B1 | * | 11/2002 | Uda et al. | 370/216 |
| 6,529,530 | B1 | * | 3/2003 | Ichii et al. | 370/537 |
| 2003/0128111 | A1 | * | 7/2003 | Sano et al. | 340/459 |

FOREIGN PATENT DOCUMENTS

JP U-1-135845 9/1989

(Continued)

OTHER PUBLICATIONS

U.S. Appl. No. 09/877,079, filed Jun. 11, 2001, Kikkawa et al.

*Primary Examiner*—Ronald D Hartman, Jr.
(74) *Attorney, Agent, or Firm*—Posz Law Group, PLC

(57) ABSTRACT

In a network system, each ECU transmits a start control frame when to start, and is started when it receives the start control frame from any other ECU during the stop of its operation. Besides, each ECU transmits a stop control frame cyclically during its operation, and continues its operation in spite of being capable of stopping its operation, while it is receiving the stop control frame from any other ECU. In transmitting each of the frames, each ECU affixes cause information expressive of a start cause or an operation stop incapability cause to the frame. In stopping a network, a supervisory device specifies the start ECU and the start cause thereof from the start control frame and stores them in a nonvolatile memory.

20 Claims, 9 Drawing Sheets

FOREIGN PATENT DOCUMENTS

| | | |
|---|---|---|
| JP | A-3-289323 | 12/1991 |
| JP | A-6-30480 | 2/1994 |
| JP | U-6-66151 | 9/1994 |
| JP | A-11-332086 | 11/1999 |
| JP | A-11-341572 | 12/1999 |
| WO | WO/99/34559 | * 7/1999 |

* cited by examiner

START CAUSE OF D-DOOR ECU

| bit7 | WKUP (EXTERNAL INPUT) |
|------|------------------------|
| bit6 | IGNITION SW-ON |
| bit5 | DOOR OUTSIDE HANDLE |
| bit4 | DOOR KEY SW |
| bit3 | DOOR LOCK SW |
| bit2 | DOOR COURTESY SW |
| bit1 | POWER WINDOW SW |
| bit0 | OTHER POWER WINDOW SW |

STOP CONTROL FRAME

STOP INCAPABILITY OF D-DOOR ECU

| bit7 | SLNG (UNDER OPERATION) |
|------|------------------------|
| bit6 | IGNITION SW-ON |
| bit5 | COURTESY LAMP-ON |
| bit4 | DOOR LOCK MOTOR-ON |
| bit3 | POWER WINDOW-ON |
| bit2 | BUS INPUT |
| bit1 | INTERNAL CONTROL |
| bit0 | INPUT CHANGE |

NETWORK SYSTEM USING MANAGEMENT FRAMES FOR SUPERVISING CONTROL UNITS

CROSS REFERENCE TO RELATED APPLICATION

This application is based on and incorporates herein by reference Japanese Patent Application No. 2001-283258 filed on Sep. 18, 2001.

FIELD OF THE INVENTION

The present invention relates to a network system, wherein control units which are disposed for respective controlled devices are set as the nodes of a network and the nodes are connected to be capable of communicating data with one another.

BACKGROUND OF THE INVENTION

In recent years, information communications have been advanced with the progress of computer technology as a background. In an automobile, a large number of control units are mounted for respective devices. A network system is provided in such a manner that the control units are set as nodes and connected by communication lines. Thus, data communications can be performed with one another among the nodes.

In one network system, a supervisory device is disposed as one of the nodes. This supervisory device monitors or supervises data frames transmitted from the respective control units and collects information expressive of the operating states (abnormalities) of the control units on the basis of the data frames. Thus, when any abnormality has occurred in the system, the control unit undergoing the abnormality can be specified from the collected information.

JP-A-11-341572, for example, discloses a multiplex data transmission system. In this system, a check memory which has a number of bits equal to the number of nodes is circulated through a network. Each node having received the check memory sets a flag at the bit assigned to the particular node, and transmits the check memory to the node of the next address. In a case where the particular node does nor receive an acknowledgment frame responsive to the transmitted check memory from the node of the next address, it transmits the check memory to the node of the next but one address. Thus, on the supervisory device side, any abnormal node can be specified from the flags of the check memory having been circulated through the network.

Besides, JP-A-11-332086, for example, discloses an abnormality detection method. In this method, a communication line is juxtaposed with a power source line so that the communication line may be electromagnetically influenced when the power source is abnormal. Thus, a communication abnormality is intentionally incurred upon the occurrence of the power source abnormality. On a supervisory device side, the abnormality of the power source line can be detected by supervising the frequency of occurrence of the communication abnormalities.

In the former system, when any abnormality has occurred in the system, the node undergoing the abnormality can be detected. In the latter method, when the abnormality has occurred in the power source, the occurrence of the abnormality can be detected. However, neither of the related techniques can specify the cause of the abnormality.

Therefore, in a case where any specified control unit continues to operate due to a malfunction in spite of a state in which the controlled device has stopped its operation, so that all the control units constituting the network system ought to stop their operations, or in a case where any control unit repeats starts and stop due to a malfunction, although the malfunctioning control unit itself can be specified by applying the former system, a long time is expended in specifying the cause of the malfunction and then improving the system.

In this case, especially when the abnormality cause of the control unit is a very infrequent abnormality cause which arises in a single-shot manner under exceptional conditions, the abnormality cause cannot be specified and hence the system cannot be improved by specifying the abnormality cause.

In order to solve this problem, it is proposed to record control contents in every control unit beforehand and to specify the abnormality cause from the stored contents. However, the quantity of data to be stored becomes enormous in a system whose control is complicated as in the automobile. Further, it is difficult to specify the abnormality cause from among the data of the enormous control contents in a short time, so that such a method cannot be adopted.

SUMMARY OF THE INVENTION

The present invention has its object to provide a network system in which, when any abnormality has occurred in the system, not only a control unit having the abnormality can be specified, but also the cause of the abnormality can be readily specified.

In a network system according to the present invention, each control unit constructing a node of a network has the function of transmitting a management frame for notifying a communication state of its own, to any other control unit. Besides, in transmitting the management frame to any other control unit, each control unit affixes the information of a control cause determining its communication state, to the management frame.

In this network system, therefore, in a case, for example, where any abnormality has occurred in data communications within the network due to the abnormal operation of any control unit, the control unit operating abnormally can be specified on the basis of the management frames transmitted from the respective control units to the network. Besides, since the information items of the control causes determining the communication states of the respective control units are affixed to the management frames, the abnormality cause of the control unit operating abnormally can be readily detected from the control cause information.

Thus, in this network system, operating contents need not be recorded in every control unit in order to specify the abnormality cause of the control unit, and the construction of each control unit can be simplified. Besides, since an analytical operation for specifying the abnormality cause is unnecessary, a job for improving or repairing the system by specifying the abnormality cause can be carried out very efficiently.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
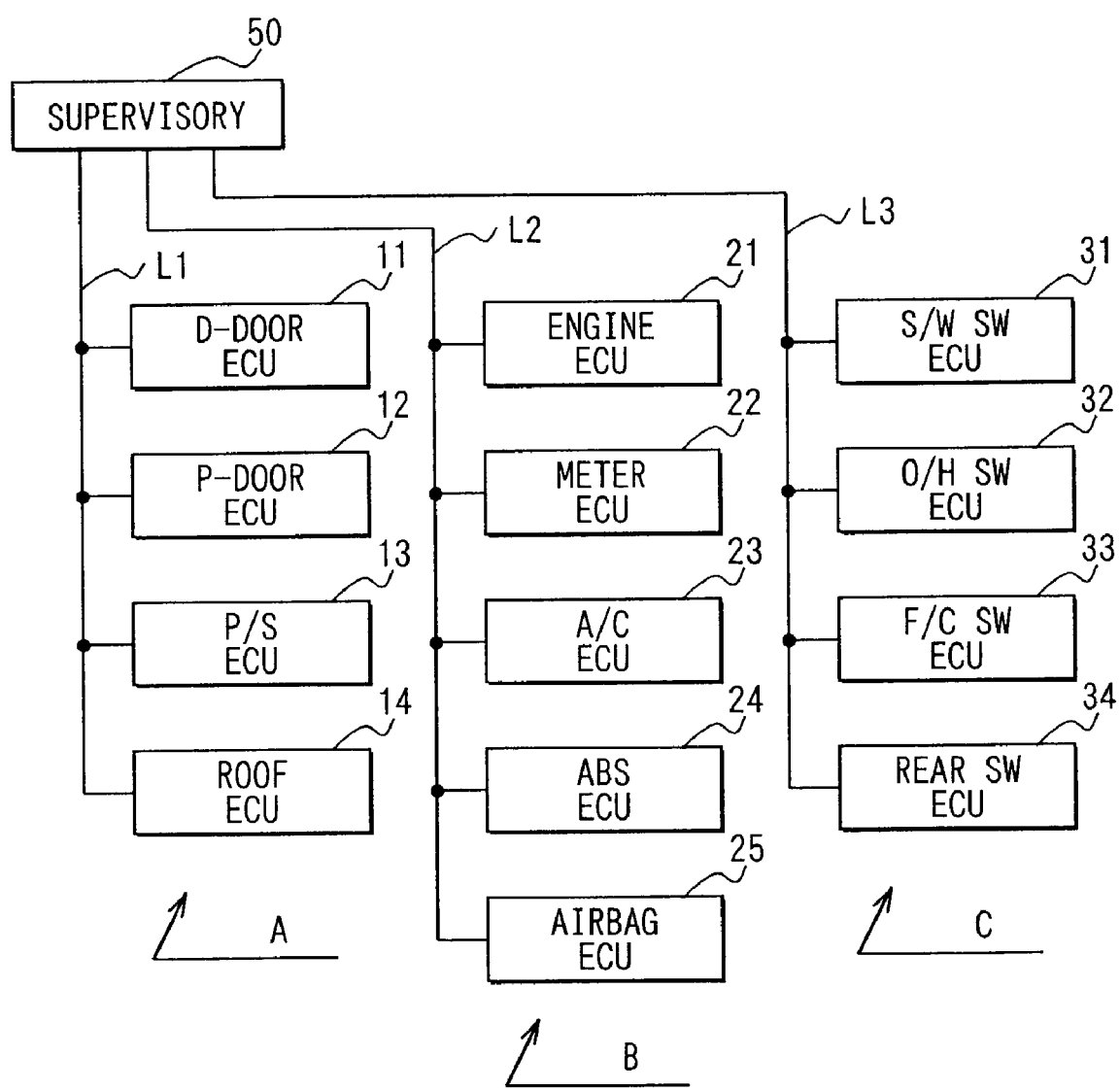
FIG. 1 is a block diagram showing a vehicular network system according to an embodiment of the present invention.

Referring to FIG. 1, a network system according to this embodiment is applied to a body system of an automobile. The network system includes a plurality of networks A, B and C. The networks A, B and C include electronic control units (ECUs) 11-14, 21-25 and 31-34 as control units which are disposed for controlled devices (vehicle constituents). The networks A, B and C also includes communication lines L1, L2 and L3 to which the corresponding ECUs 11-14, 21-25 and 31-34 are respectively connected as nodes. Besides, a supervisory device 50 which has the functions of start supervision and stop supervision is connected to the communication lines L1, L2 and L3 of the respectively corresponding networks A, B and C.

Here, in the network A, the D-door ECU 11 for controlling a driver seat door, the P-seat door ECU 12 for controlling a passenger (or assistant driver) seat door, the power seat ECU 13 for controlling a power seat, and the roof ECU 14 for controlling a roof door are connected to the communication line L1. In the network B, the engine ECU 21 for controlling an engine, the meter ECU 22 for controlling meters, the air conditioning ECU 23 for controlling an air conditioner, the ABS ECU 24 for controlling slip in the case of braking the vehicle, and the airbag ECU 25 for controlling an airbag are connected to the communication line L2. In the network C, the steering wheel SW ECU 31 for controlling various control switches (SWs) mounted on a steering wheel, the overhead SW ECU 32 for controlling various control switches (SWs) mounted on the ceiling portion of the vehicle, the front control SW ECU 33 for controlling various control switches (SWs) mounted on the instrument panel portion of the vehicle, and the rear SW ECU 34 for controlling various control switches (SWs) mounted on the rear seat of the vehicle are connected to the communication line L3. Besides, data which the nodes (ECUs) transmit/receive in the corresponding networks A-C are transferred to the other networks by the operation of the supervisory device 50 as may be needed.

All of the supervisory device 50 and the ECUs 11-34 being the nodes of the network system are always fed with power supply by a battery (not shown) while detouring a switching circuit which is turned on/off by a key switch, likewise to some constituents for, e.g., operating doors as are required to be always operable. Thus, the power from the battery is not cut off even when a key switch (not shown) is turned off. That is, even when a key power source is turned off by, for example, pulling the key out of the key box of a driver seat, to bring the automobile itself into a state where its operation is stopped, the networks A-C are held in a state capable of communicating data with one another.

Besides, the ECUs 11-34 transmit management frames for managing the system, in conformity with a predetermined communication protocol such as CAN (Controller Area Network) and separately from data frames for transmitting/receiving various data necessary for the controls, and they have their stops and starts changed over in each of the networks A-C on the basis of the management frames. FIGS. 2A and 2B and FIGS. 3A and 3B are explanatory diagrams showing the management frames.

Figures 2A, 2B:
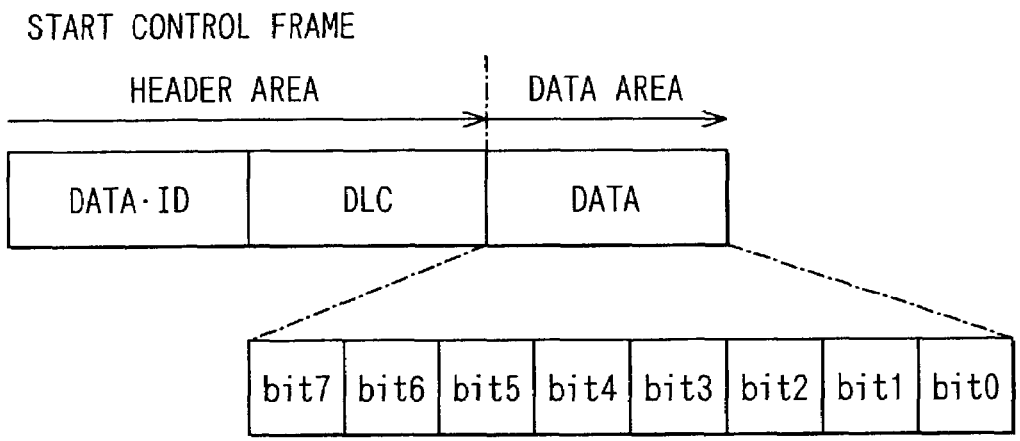
FIGS. 2A and 2B are explanatory diagrams showing a start control frame which each ECU of the network transmits at the time of start.

The management frame shown in FIGS. 2A and 2B is a start control frame in accordance with which, upon starting, each of the ECUs 11-34 transmits information indicative of its start to the other ECUs. As exemplified in FIG. 2A, the start control frame is composed of a header area including a data ID (DATA•ID) which expresses the sort of transmission data generated in conformity with the CAN protocol, as well as a data length code (DLC) which expresses a data length, and a data area including start cause information (DATA) which indicates that each of the ECUs 11-34 has been started.

Besides, in this embodiment, the data length of the start cause information is one byte (8 bits), and the start cause of each of the ECUs 11-34 is allotted every bit. By way of example, FIG. 2B lists the start causes which are allotted to the respective bits of the start cause information in the D-door ECU 11. As understood from the figure, a flag WKUP which expresses that the D-door ECU 11 has been started by the cause of the input of an external signal is set at the highest-order bit "bit7" of the start cause information. A flag which expresses the start caused by the turn-on of the key power source (ignition SW-ON) is set at the second highest-order bit "bit6".

In addition, flags which express the start caused by the state change of a door outside handle switch, the start caused by the state change of a door key switch, the start caused by the state change of a door lock switch, the start caused by the state change of a door courtesy switch, the start caused by the state change of a power window switch, and the start caused by the state change of a switch for remote-controlling an other-seat power window are respectively set as information expressive of detailed input causes at the third highest-order bit "bit5" through the lowest-order bit "bit0".

Each of the bit data (flags) indicates the existence of the corresponding start cause when set to "1", and the nonexistence of the corresponding start cause when set to "0".

Besides, in the networks A-C, when each of the ECUs 11-34 receives the start control frame from any other ECU, it is automatically started in order to shift the network into a communicable state (operating state). It further transmits the start control frame endowed with the start cause information of its own, in order to notify the start to the other ECU. As a result, in the networks A-C, the ECUs 11-34 are individually started by the start causes (WKUP) of their own or attendant upon the starts of the other ECUs until all the ECUs 11-34 are finally started.

Incidentally, the start control frames are supervised by the supervisory device 50. Besides, when the supervisory device 50 receives the start control frame from any ECU in a state where the key power source is OFF and where the operations of the automobile itself and the ECUs are stopped, it detects the started ECU on the basis of the start control frame and the data frame separately transmitted from the particular ECU. It stores the start cause information given in the data area of the start control frame, in a memory which is constructed with a nonvolatile memory.

Figures 3A, 3B:
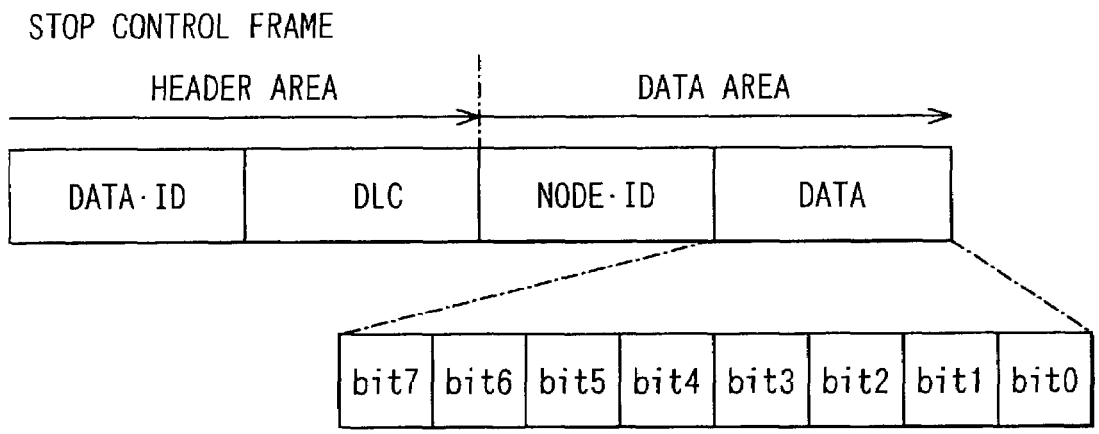
FIGS. 3A and 3B are explanatory diagrams showing a stop control frame which each ECU of the network transmits cyclically during its operation.

On the other hand, the management frame shown in FIGS. 3A and 3B is a stop control frame in accordance with which, during its operation, each of the ECUs 11-34 in the networks A-C transmits information indicative of incapability to stop the operation, to the other ECUs. As exemplified in FIG. 3A, the stop control frame is composed of a header area including a data ID (DATA•ID) which expresses the sort of transmission data generated in conformity with the CAN protocol, as well as a data length code (DLC) which expresses a data length, and a data area including a node ID (NODE•ID) which is the identification information of the ECU itself, as well as stop incapability cause information (DATA) which indicates the reason why the ECU is incapable of stopping its operation.

Besides, in this embodiment, the data length of the stop incapability cause information is one byte (8 bits) similarly to that of the start cause information. The stop incapability cause of each of the ECUs 11-34 is also allotted every bit. By way of example, FIG. 3B lists start causes which are allotted to the respective bits of the stop incapability cause information in the D-door ECU 11. As understood from the figure, a flag SLNG which expresses that the D-door ECU 11 is being operated by the cause of the input of an external signal or the cause of the output of a signal is set at the highest-order bit "bit7" of the stop incapability cause information. A power source cause flag which expresses the proceeding of the operation because of the turn-on state of the key power source (ignition SW-ON state) is set at the second highest-order bit "bit6".

In addition, flags which express "under lighting a courtesy lamp", "under driving a door lock motor", "under driving a power window", "under inputting data through the communication line L1 (bus input signal cause)", "under an ECU control process (internal control cause)", and "under the state change of a signal input loop" are respectively set as information expressive of detailed input/output causes at the third highest-order bit "bit5" through the lowest-order bit "bit0".

Each of the bit data (flags) indicates the existence of the corresponding stop incapability cause when set to "1" and the nonexistence of the corresponding stop incapability cause when set to "0".

Besides, in the networks A-C, while the stop control frame is being transmitted from any other ECUs, each of the ECUs 11-34 does not stop its operation, that is, it does not fall into a sleep state, even when it is capable of stopping its operation in the state where the key power source is OFF to stop the operation of the automobile itself. Further, until each ECU falls into a state where it is capable of stopping its operation, it transmits the stop control frame endowed with the stop incapability cause information of its own, at preset transmission time intervals in order to notify the operation stop to the other ECU.

As a result, each of the ECUs 11-34 continues to operate until no ECU comes to transmit the stop control frame in excess of the transmission time interval after all the ECUs 11-34 constituting the networks A-C have become capable of stopping their operations. Thereafter, the ECUs 11-34 stop their operations individually.

Likewise to the start control frames, the stop control frames are supervised by the supervisory device 50. If any ECU is transmitting the stop control frame even after the lapse of a predetermined wait time longer than the transmission time interval, in spite of the state where the key power source has turned off to stop the operation of the automobile itself, the supervisory device 50 detects the ECU. The supervisory device 50 stores the stop incapability cause information affixed to the stop control frame, in the storage nonvolatile memory.

Figure 4:
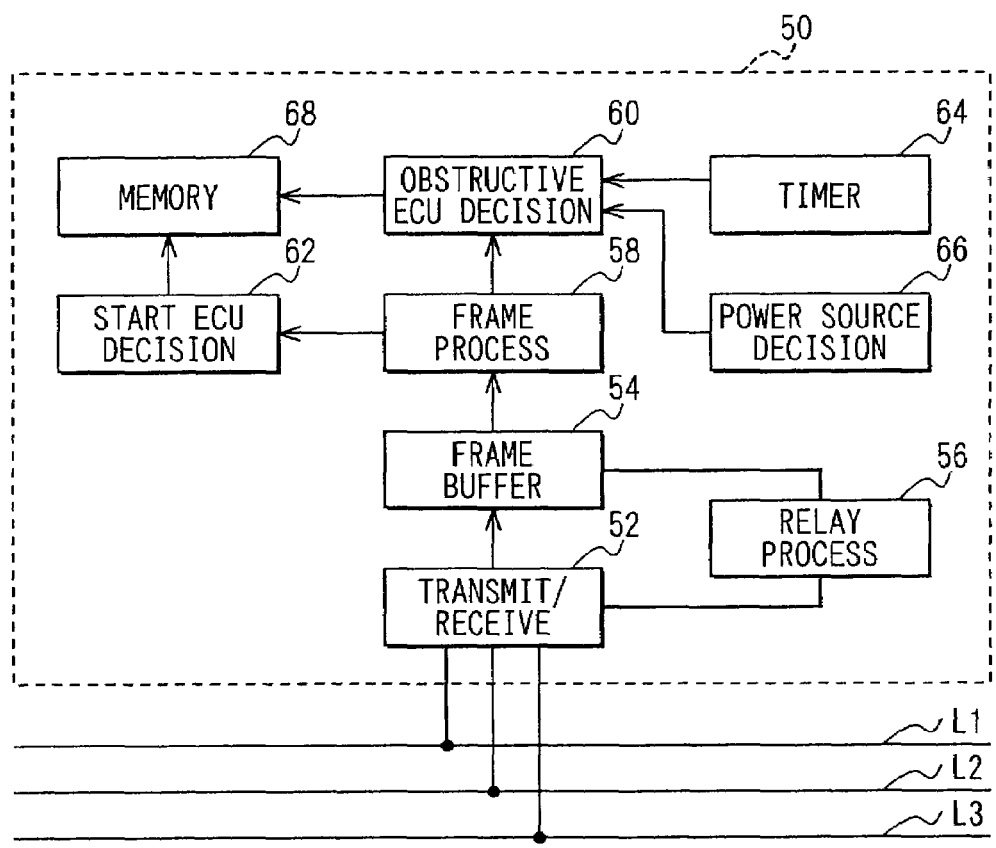
FIG. 4 is a functional block diagram showing a supervisory device used in the embodiment.

As shown in FIG. 4 in the functional block diagram form, the supervisory device 50 is actually constructed primarily with a microcomputer having a communication function, likewise to each of the ECUs 11-34.

As shown in FIG. 4, the supervisory device 50 includes a network transmission/reception unit 52 which communicates data with the ECUs 11-34 of the networks A-C through the respective communication lines L1-L3, a reception frame buffer 54 in which transmission data (reception frames) from the ECU 11-34 as received by the network transmission/reception unit 52 are temporarily stored, and a relay processing unit 56 which accepts a data frame from the reception frame buffer 54 and which transfers the data frame to the network different from the network to which the ECU having transmitted the data frame belongs.

The supervisory device 50 further includes a management frame processing unit 58 which accepts the management frames from the reception frame buffer 54. The unit 58 classifies the management frames into the start control frame and stop control frame, and derives the various cause information therefrom. The supervisory device 50 also includes a stop-obstructive ECU decision unit 60, which accepts the information affixed to the stop control frame from the management frame processing unit 58. The unit 60 detects or decides a stop-obstructive ECU obstructing the stop of any ECU in the networks A-C in spite of the OFF state of the key power source and the stop of the operation of the automobile itself, on the basis of the accepted information. The device 50 stores the stop incapability cause information in a memory unit 68 constructed with a nonvolatile memory such as EEPROM. The supervisory device 50 also includes a start ECU decision unit 62, which accepts the information affixed to the start control frame from the management frame processing unit 58. The unit 62 decides a start ECU having first started in the operation stop states of the networks A-C, on the basis of the accepted information, and stores the start cause information in the memory unit 68.

The stop-obstructive ECU decision unit 60 is connected with a timer unit 64 which keeps the detection time period of the stop-obstructive ECU, etc., and a vehicular power source decision unit 66 which decides the ON/OFF state of the key power source of the vehicle.

Figure 5A:
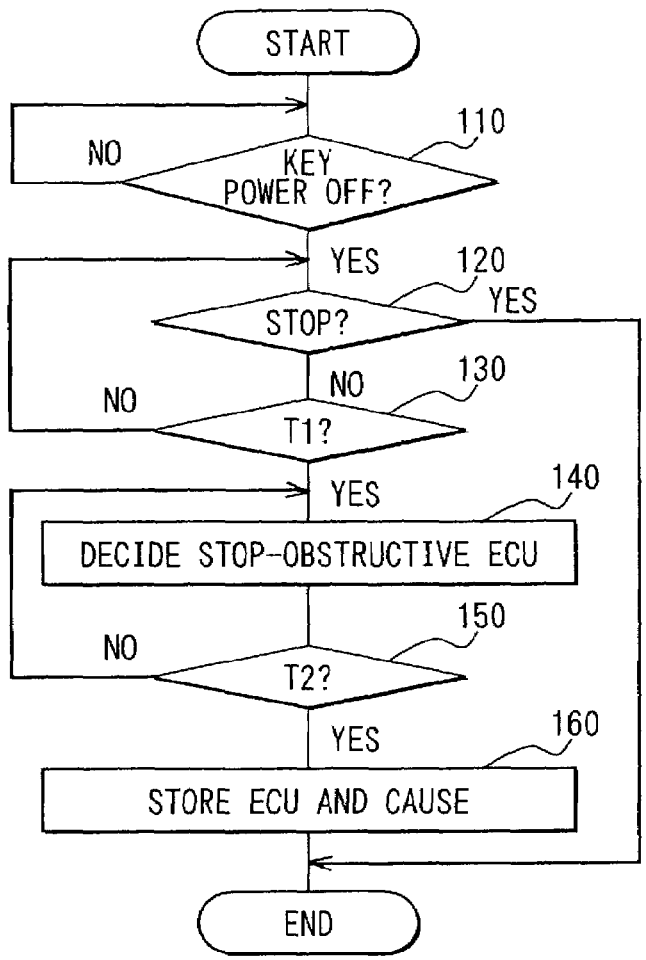
FIGS. 5A and 5B are flow charts showing a first stop-obstructive ECU decision process and a start ECU decision process which are executed in the supervisory device, respectively.
Figure 5B:
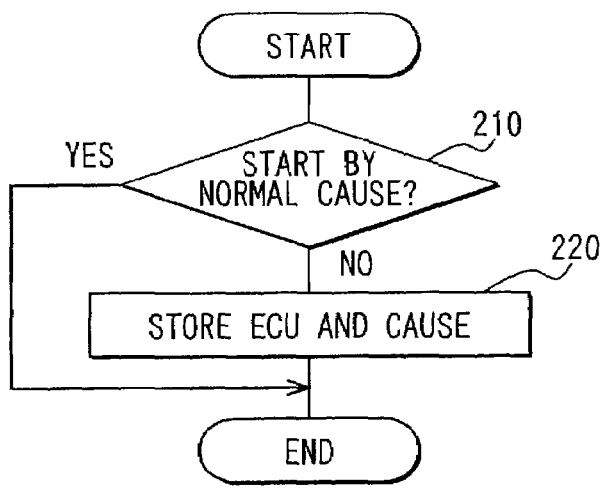

A stop-obstructive ECU decision process is shown in FIG. 5A, and is executed for each of the networks A, B and C by a CPU (not shown) in order to incarnate the functions of the stop-obstructive ECU decision unit 60 in the supervisory device 50. A start ECU decision process is shown in FIG. 5B and executed for each of the networks A, B and C by a CPU (not shown) in order to incarnate the functions of the start ECU decision unit 62.

In the process of FIG. 5A, at a step 110, whether or not the key power source has been turned off is decided, thereby to wait for a state where the automobile being the controlled device has its operation stopped.

When the key power source is turned off to establish the operation stop state of the automobile itself, whether or not a stop control frame has not been transmitted continuously in excess of a transmission time interval at which each ECU transmits the stop control frame during its operation, in the network to-be-supervised, is decided at the subsequent step 120, thereby to decide whether or not the stop condition of the network has held. If the stop condition of the network has held, any stop-obstructive ECU does not exist, and hence, the process is directly ended.

In contrast, subject to the decision at step 120 that the stop condition has not held, whether or not a wait time (detection start time T1) longer than the transmission time interval has lapsed since the turn-off of the key power source is decided at the subsequent step 130.

Herein, when it is decided at step 130 that the detection start time T1 has not lapsed, the routine returns to step 120 again. To the contrary, when it is decided that the detection start time T1 has lapsed (that is, in a case where the stop condition of the network has not held during the detection start time T1), the routine proceeds to step 140, at which a stop-obstructive ECU detection process is executed for detecting the ECU transmitting the stop control frame, as the stop-obstructive ECU.

Besides, during the execution of the stop-obstructive ECU detection process, whether or not a preset detection time T2 has lapsed is decided at the subsequent step 150. Unless the detection time T2 has lapsed, the routine returns to step 140 again, thereby to continuously execute the stop-obstructive ECU detection process for the preset detection time T2.

Besides, when it is decided at step 150 that the detection time T2 has lapsed, the routine proceeds to the subsequent step 160. Here at step 160, the ECU which is actually obstructing the stop of the network is specified on the basis of stop incapability cause information affixed to the stop control frames of all the ECUs detected as the stop-obstructive ECUs by the obstructive ECU detection process of step 140. Further, the specified stop-obstructive ECU, and the stop incapability cause information affixed to the stop control frame transmitted by this ECU are stored in the memory unit 68.

Figure 6A:
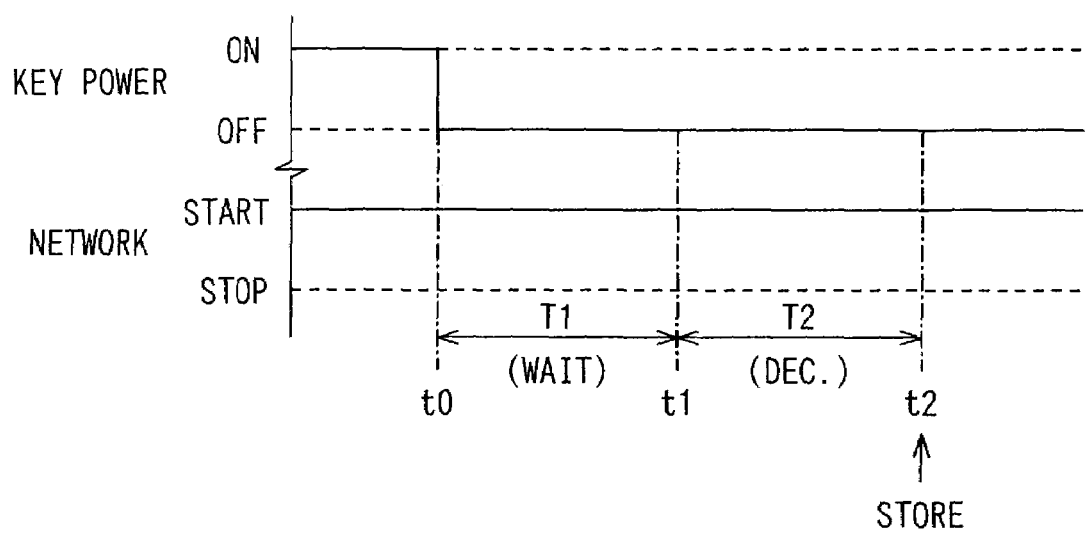
FIGS. 6A and 6B are timing charts showing the operations of the supervisory device, respectively.

As a result, in case of an abnormality shown in FIG. 6A where, in any of the networks A, B and C, any ECU which does not fall into a stop capability state capable of stopping its operation (in other words, which is obstructing the stop of any other ECU) exists in spite of the lapse of the detection start time T1 (at a point of time t1) after the turn-off of the key power source at a point of time t0, so that electric power accumulated in the battery is wastefully consumed to incur "battery run-down", the stop-obstructing ECU and also the cause of the obstruction of the stop can be readily specified on the basis of the stop incapability cause information stored in the memory unit 68.

Moreover, in this embodiment, when the operation of detecting the stop-obstructive ECU is initiated upon the lapse of the detection start time T1 (at the point of time t1) after the turn-off of the key power source (at the point of time t0), the detection operation is thereafter continued for the predetermined detection time T2, and the true stop-obstructive ECU is specified at a point of time (t2) at which the detection time T2 has lapsed, on the basis of the stop incapability cause information transmitted from the stop-obstructive ECUs detected till then. Therefore, even in a case where the plurality of stop-obstructive ECUs have been detected by the stop-obstructive ECU detection process (step 140), the cause of the abnormality of the stop-obstructive ECU can be accurately specified from the stop incapability cause information stored in the memory unit 68.

According to this embodiment, therefore, operating contents need not be recorded in every ECU in order to specify the stop incapability cause of the stop-obstructive ECU, and the construction of each ECU can be simplified. Also, an analytical operation for specifying the stop incapability cause is dispensed with, so that a job for improving or repairing the system by specifying the stop incapability cause can be performed very efficiently. Moreover, the stop incapability cause information is automatically stored in the memory unit 68. Thus, even when the stop-obstructive ECU has returned from an abnormal state into a normal state, the cause of the abnormality can be easily specified on the basis of the stored stop incapability cause information, and the cause of the abnormality can be specified without problem even if less frequent.

The start ECU decision process shown in FIG. 5B is executed when any ECU has transmitted a start control frame in the operation stop state of the network to-be-supervised. When the process is started, start cause information affixed to the start control frame is read out at step 210 so as to decide whether the cause of start is a cause peculiar to the ECU having transmitted the start control frame or a cause ascribable to any other ECU. In case of the start cause other than the cause peculiar to the particular ECU, the start is normal and not based on the malfunction of the particular ECU, and hence, the process is directly ended.

In contrast, when it is decided at step 210 that the start cause is the cause peculiar to the ECU having transmitted the start control frame, that is, the start cause is not normal, the ECU having started this time is specified from a data frame separately transmitted from the particular ECU and the start control frame received this time, and information expressive of the particular ECU and the start cause information obtained from the start control frame are stored in the memory unit 68 (step 220). Then, the process is ended.

Figure 6B:
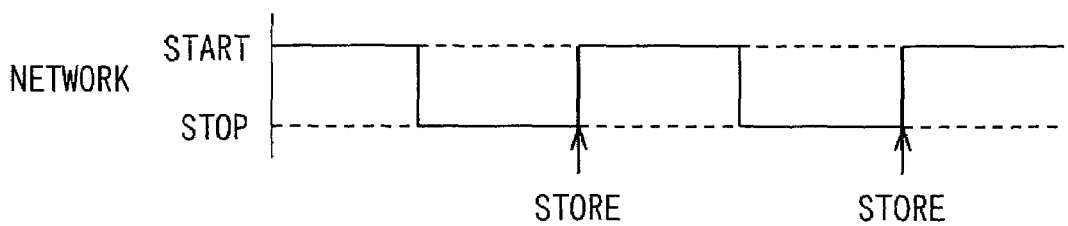

According to this embodiment, therefore, in a case, for example, where any of the ECUs constituting the networks A, B and C repeats starts and stops due to its malfunction as shown in FIG. 6B, the start cause of the particular ECU is repeatedly stored in the memory unit 68 at the starts of the particular ECU. According to this embodiment, accordingly, operating contents at the start need not be recorded in every ECU in order to specify the abnormality cause of the starts/stops of the ECU, and hence, the construction of each ECU can be simplified. Also, an analytical operation for specifying the abnormality cause is unnecessary, so that a job for improving or repairing the system by specifying the abnormality cause can be performed very efficiently.

Moreover, according to the system of this embodiment, not only in a case where the system cannot be stopped, but also in a case where any specified ECU abnormally repeats the starts and stops due to the malfunction, the start cause information of the abnormal ECU is stored in the memory, so that even when the ECU has returned from an abnormal state into a normal state, the abnormality cause of the control unit can be easily specified on the basis of the stored start cause information, and the abnormality cause can be specified without difficulty even if less frequent.

The above embodiment may be modified in various aspects.

By way of example, in the embodiment, the on-vehicle LAN which is so constructed that each control unit (ECU) transmits the start control frame and the stop control frame as the management frames. However, each control unit may transmit management frames other than the control frames. More specifically, in this case, when each control unit is constructed so as to affix information expressive of a control cause to the management frame which it transmits, the abnormal operation of each control unit and the cause of the abnormality can be specified from the management frame.

Besides, the on-vehicle LAN may be modified to any network system in which control units (ECUs) disposed for a plurality of controlled devices are connected by communication lines so as to be capable of transmitting and receiving data to and from with one another. In addition, even when the network is constructed as a "radio LAN" in which the respective control units are connected by radio channels, not by the communication lines, similar advantages as above can be attained.

Meanwhile, in the embodiment, the functions of start supervision means stated in Claim 3 or 7 and stop supervisory unit stated in Claim 5 or 7 are incorporated into the single supervisory device 50, but they may well be distributed among a plurality of ECUs.

Besides, in the embodiment, the stop-obstructive ECU decision process is so carried out that the stop-obstructive ECU detection process for detecting the ECU transmitting the stop control frame for the detection time T2 is executed, whereupon the ECU actually obstructing the stop is specified from among the ECUs detected as the stop-obstructive ECUS by the detection process. By way of example, however, from among the ECUs detected as the stop-obstructive ECUs by the stop-obstructive ECU detection process (S140), the ECUs detected first and lastly are specified as those obstructing the stop, at step 160.

Figure 7A:
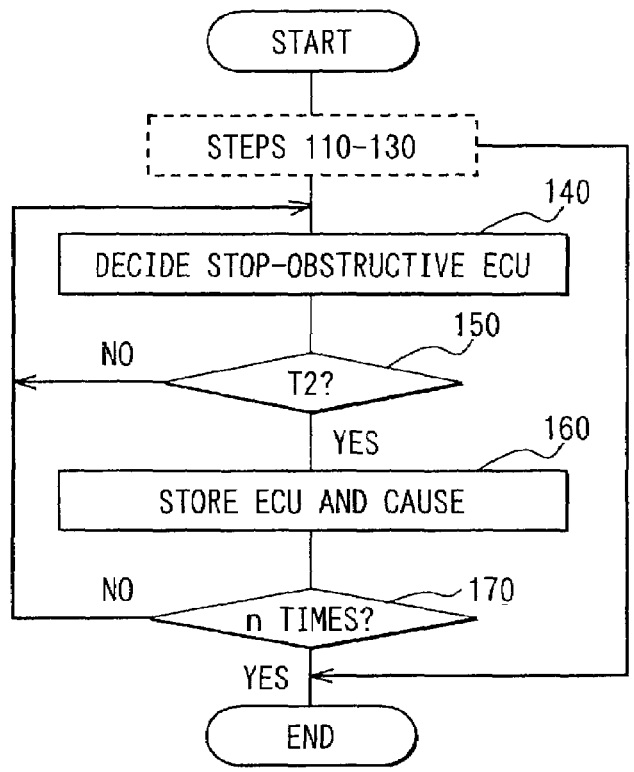
FIGS. 7A and 7B are a flow chart and a timing chart showing a second stop-obstructive ECU decision process, respectively.

Besides, by way of example, the stop-obstructive ECU decision process may well be altered as shown in FIG. 7A. More specifically, at steps S140-S160, the stop-obstructive ECU detection process is executed for the detection time T2, and the ECU actually obstructing the stop is thereafter specified and stored in the memory unit 68. Subsequently, whether or not such processing was executed a plurality of times (n times) is decided at step 170. Unless the processing of steps S140-S160 is not executed the plurality of times, it may well be executed again.

Figure 7B:
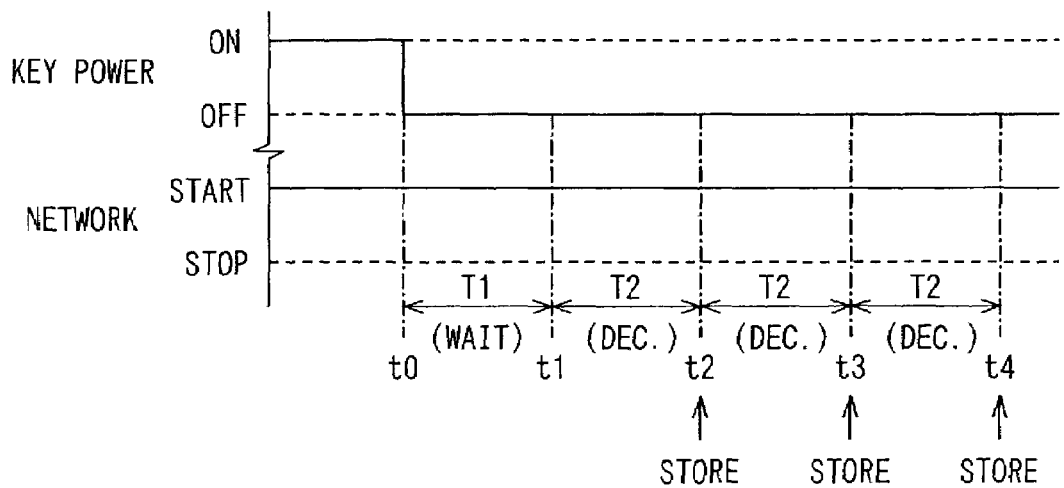

In this way, as shown in FIG. 7B, the stop-obstructive ECU detection process at step 140 is executed the plurality of times at the intervals of the detection time T2, whereupon the stop-obstructive ECUs and their stop incapability causes specified at step 160 are stored in the memory unit 68 successively in correspondence with the plurality of times. Therefore, the stop incapability causes arising in the stop-obstructive ECUs can be more accurately specified from the information stored in the memory unit 68.

Figure 8A:
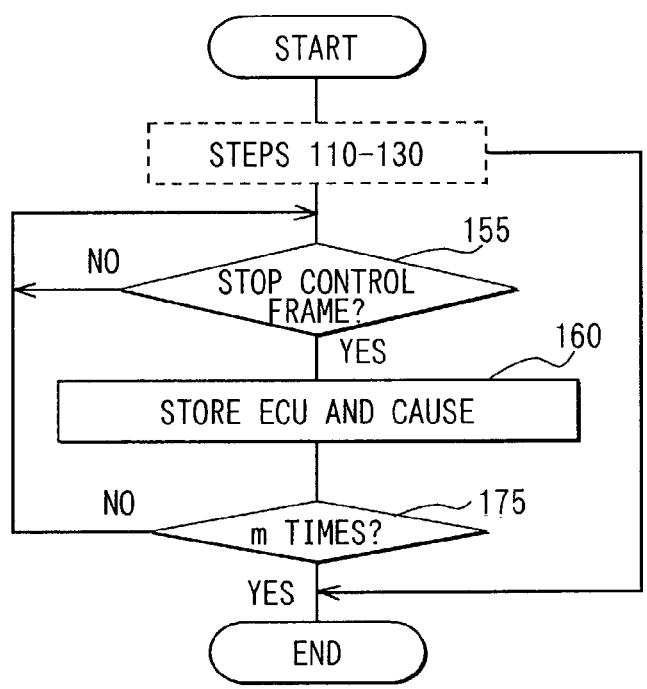
FIGS. 8A and 8B are a flow chart and a timing chart showing a third stop-obstructive ECU decision process, respectively.

Besides, by way of example, the stop-obstructive ECU decision process may well be altered as shown in FIG. 8A. More specifically, after the turn-off of the key power source, the detection start time T1 lapses. Thereafter, each time the stop control frame is received (YES at step 155), the ECU having transmitted the stop control frame is stored in the memory unit 68 as the stop-obstructive ECU, together with its stop incapability cause information (at step 160). When such processing (at steps S110-S160) is executed a plurality of times (m times) (YES at a step 175), the stop-obstructive ECU decision process may be ended.

Figure 8B:
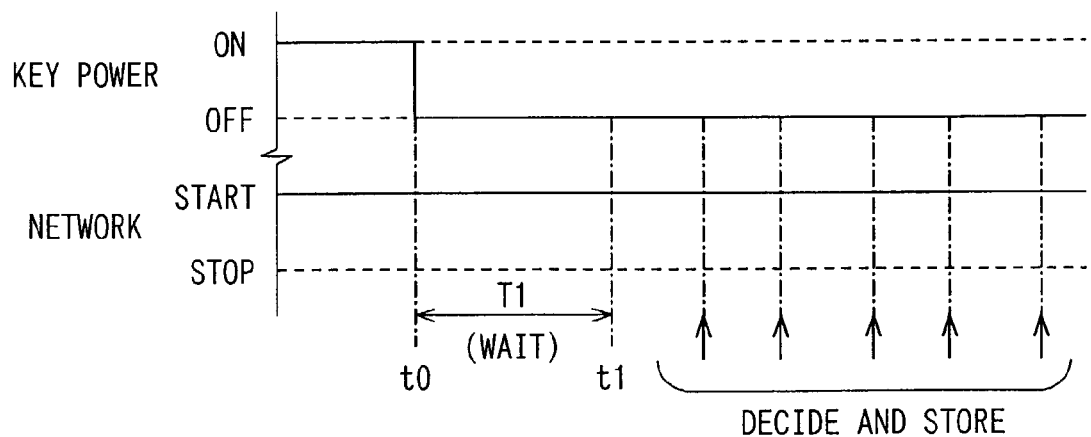

In this way, as shown in FIG. 8B, upon the lapse of the detection start time T1 after the turn-off of the key power source, the process for detecting the stop-obstructive ECUs is executed until the stop control frames are received the plurality of times, and the plurality of stop-obstructive ECUs specified by the detection process are directly stored in the memory unit 68, together with the stop incapability cause information. Also in this case, the stop incapability causes arising in the stop-obstructive ECUs can be accurately specified from the plurality of stop-obstructive ECUs and their stop incapability cause information stored in the memory unit 68. The stop-obstructive ECU decision process shown in FIG. 8B corresponds to stop supervision function.

Figure 9A:
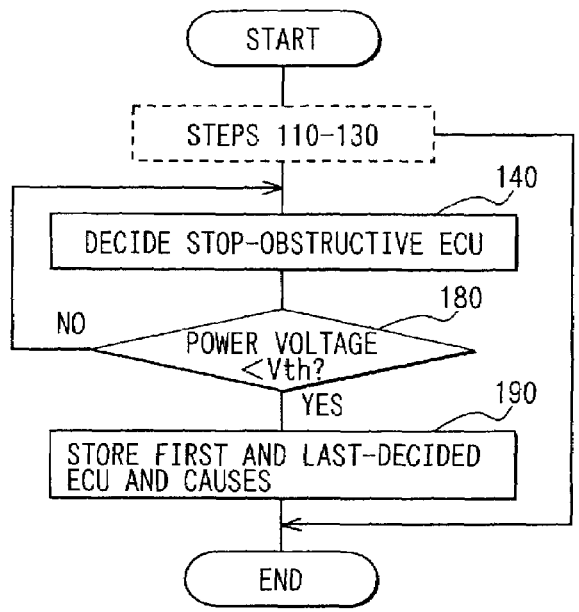
FIGS. 9A and 9B are a flow chart and a timing chart showing a fourth example of the stop-obstructive ECU decision process, respectively.

Further, the stop-obstructive ECU decision process may well be altered as shown in FIG. 9A. More specifically, the stop-obstructive ECU detection process at step 140 is repetitively executed until a supply voltage (a voltage fed from the battery) becomes lower than a predetermined voltage Vth (for example, a voltage with which the supervisory device 50 is incommunicable). When the supply voltage becomes lower than the predetermined voltage Vth (YES at a step 180), the ECUs detected first and lastly as the stop-obstructive ECUs by the stop-obstructive ECU detection process at step 140 are decided as the ECUs actually obstructing the stop, and the two ECUs and their stop incapability cause information are stored in the memory unit 68.

Figure 9B:
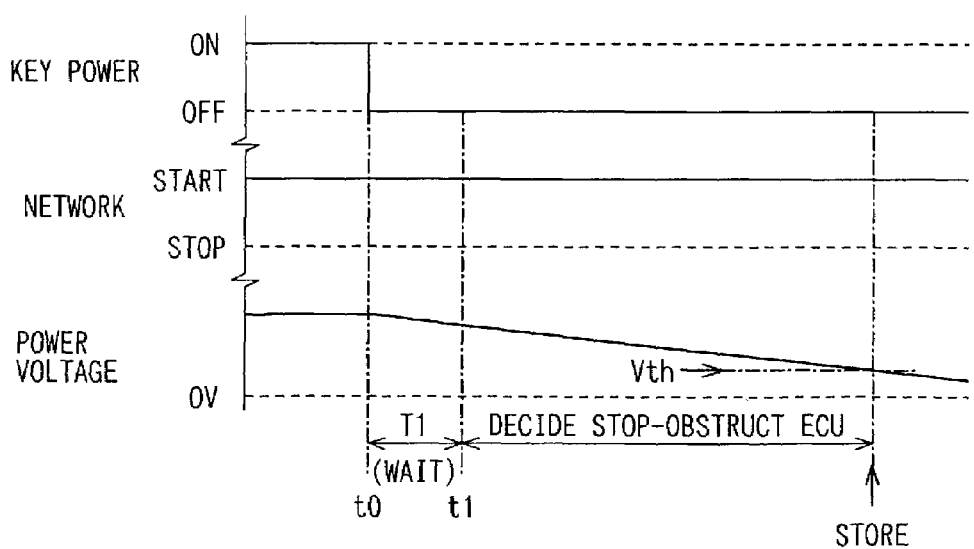

In more detail, in the network system for the automobile as in the embodiment, the individual ECUs are operated by the power feed from the common battery. Therefore, when all the ECUs constituting the network continue to be operated by the stop-obstructive ECUs in a state where the battery is not charged because of the stop of the operation of the automobile itself, the battery is finally discharged completely. However, in the case where, as shown in FIG. 9B, the stop-obstructive ECU detected immediately before the supervisory device 50 becomes incommunicable due to the discharge of the battery, and the stop-obstructive ECU detected immediately after the start of the stop-obstructive ECU detection are stored in the memory unit 68 together with the stop incapability cause information, the abnormality causes can be specified from the stop incapability information of the ECU having first obstructed the stop and the ECU having obstructed the stop to the last. Incidentally, the stop-obstructive ECU decision process shown in FIG. 9A corresponds to stop supervision function.

Meanwhile, in the embodiment, the start cause information which is affixed to the start control frame transmitted at the start by each of the ECUs 11-34, or the stop incapability cause information which is affixed to the stop control frame transmitted at the predetermined transmission time intervals during the operation by each of the ECUs 11-34, has been described as consisting of the 1-byte data in which the various causes are expressed in bit units. It is also allowed, however, to adopt data in which each of the various causes is expressed by a code of predetermined bit length, or data which includes an area where the various causes are expressed in bit units, and an area where they are expressed by codes. Besides, the data lengths of the individual cause information need not be equalized in all the ECUs 11-34 as in the embodiment, but they may well be appropriately set in accordance with the sorts (numbers) of start causes which are to be transmitted by the respective ECUs 11-34.

What is claimed is:

1. A network system comprising:
control units disposed for respective controlled devices to be controlled as nodes of a network, the nodes being connected to be capable of communicating data with one another,
wherein each control unit has a function of transmitting a management frame for notifying its communication state to any other control units, and the control unit affixes information of a control cause determining its communication state to the management frame, wherein the control unit transmits a start control frame which is the management frame for starting the system to any other control units when it starts, wherein the control unit is started when it receives the start control frame from any other control units during stop of its operation, and wherein the control unit affixes start cause information expressive of a cause of the start of its own to the start control frame as the information of the control cause.

2. A network system according to claim 1, wherein at least one of the nodes constituting the network includes a start supervision unit for detecting the control unit having transmitted the start control frame on the basis of the start control frame when the start control frame is transmitted from any of the control units in a state where the controlled device has stopped its operation, and for storing the start cause information affixed to the start control frame, in a nonvolatile storage device together with information expressive of the detected control unit.

3. A network system comprising:

control units disposed for respective controlled devices to be controlled as nodes of a network, the nodes being connected to be capable of communicating data with one another, wherein each control unit has a function of transmitting a management frame for notifying its communication state to any other control units, and the control unit affixes information of a control cause determining its communication state to the management frame, wherein the control unit transmits a stop control frame expressive of incapability to stop the system, as the management frame for stopping the system, at predetermined transmission time intervals during its operation, wherein the control unit suspends transmission of the stop control frame when it falls into a state where it is capable of stopping its operation, and stops its operation when a state where the stop control frame is not transmitted from any other control units continues for, at least, a wait time longer than the transmission time interval after the suspension of the transmission, and wherein the control unit affixes stop incapability cause information expressive of a cause of incapability to stop its operation, to the stop control frame as the information of the control cause.

4. A network system according to claim 3, wherein at least one of the nodes constituting the network includes a stop supervisory unit for detecting the control unit operating in excess of the wait time, on the basis of the stop control frame transmitted from any of the control units after the controlled device has fallen into its operation stop state from its operating state, and for storing the stop incapability cause information affixed to the stop control frame in a nonvolatile storage device together with information expressive of the detected control unit.

5. A network system according to claim 3, wherein data in which various stop incapability causes are expressed in bit units are affixed to the stop control frame as the stop incapability cause information.

6. A network system according to claim 5, wherein a data length of the stop incapability cause information affixed to the stop control frame is set for every control unit in accordance with the number of the stop incapability causes of the control unit.

7. A network system according to claim 3, wherein data in which various stop incapability causes are expressed by predetermined codes are affixed to the stop control frame as the stop incapability cause information.

8. A network system according to claim 3, wherein data which includes an area for expressing various stop incapability causes in bit units and an area for expressing the various stop capability causes by codes are affixed to the stop control frame as the stop incapability cause information.

9. A network system according to claim 4, wherein for a predetermined detection time after the wait time is exceeded since the shift of the controlled device from its operating state into its operation stop state, the stop supervisory unit detects the control unit operating in excess of the wait time, on the basis of the stop control frame transmitted from any of the control units, whereupon it stores the information expressive of the detected control unit and the stop incapability cause information affixed to the stop control frame from the detected control unit, in the storage device.

10. A network system according to claim 4, wherein after the wait time is exceeded since the shift of the controlled device from its operating state into its operation stop state, the stop supervisory unit executes a detection operation for detecting the control unit operating in excess of the wait time, a plurality of times on the basis of the stop control frame transmitted from any of the control units, whereupon it stores the information expressive of the control units detected by the plurality of times of detection operations and the stop incapability cause information affixed to the stop control frames from the detected control units, in the storage device.

11. A network system according to claim 4, wherein the respective nodes are operated with electric power from a common battery mounted in a vehicle, and the stop supervisory unit detects the control unit operating in excess of the wait time, until it becomes incapable of receiving the transmission frame from any other control units on account of lowering of a supply voltage from the battery, since the shift of the controlled device from its operating state into its operation stop state, and it stores the information expressive of the detected control unit and the stop incapability cause information affixed to the stop control frame from the detected control unit, in the storage device.

12. A network system according to claim 4, wherein the respective nodes are operated with electric power from a common battery mounted in a vehicle, and the stop supervisory unit detects the control unit operating in excess of the wait time, until a supply voltage from the battery lowers to a predetermined voltage, since the shift of the controlled device from its operating state into its operation stop state, and it stores the information expressive of the detected control unit and the stop incapability cause information affixed to the stop control frame from the detected control unit, in the storage device.

13. A network system according to claim 4, wherein when the stop supervisory unit detects a plurality of such control units operating in excess of the wait time, it specifies the control unit obstructing the stop, on the basis of the stop incapability cause information affixed to the stop control frames from the plurality of detected control units, whereupon it stores the information expressive of the specified control unit and the stop incapability cause information affixed to the stop control frame from the specified control unit, in the storage device.

14. A network system according to claim 4, wherein
the stop supervisory unit detects a plurality of such control units operating in excess of the wait time, it specifies the first detected control unit and the lastly detected control unit as the control units obstructing the stop, whereupon it stores the information expressive of the specified control units and the stop incapability cause information affixed to the stop control frames from the specified control units, in the storage device.

15. A network system comprising:
control units disposed for respective controlled devices to be controlled nodes of a network, the nodes being connected to be capable of communicating data with one another,
wherein each control unit has a function of transmitting a management frame for notifying its communication state to any other control units, and the control unit affixes information of a control cause determining its communication state to the management frame,
wherein the control unit transmits a start control frame which is the management frame for starting the system to any other control units when it starts, and it is started when it receives the start control frame from any other control unit during stop of its operation,
wherein the control unit transmits a stop control frame expressive of incapability to stop the system as the management frame for stopping the system at predetermined transmission time intervals during its operation after the start,
wherein the control unit suspends the transmission of the stop control frame when it falls during its operation into a state where it is capable of stopping its operation, and it stops its operation when a state where the stop control frame is not transmitted from any other control unit continues for, at least, a wait time longer than the transmission time interval after the suspension of the transmission, and
wherein the control unit affixes start cause information expressive of a cause of the start of its own to the start control frame as the information of the control cause, and also affixes stop incapability cause information expressive of a cause of incapability to stop its operation to the stop control frame as the information of the control cause.

16. A network system according to claim 15, wherein
at least one of the nodes constituting the network includes a start supervision unit for detecting the control unit having transmitted the start control frame, on the basis of the start control frame when the start control frame is transmitted from any of the control units in a state where the controlled device has stopped its operation, and for storing the start cause information affixed to the start control frame, in a nonvolatile storage device together with information expressive of the detected control unit, and
a stop supervisory unit for detecting the control unit operating in excess of the wait time, on the basis of the stop control frame transmitted from any of the control units after the controlled device has fallen into its operation stop state from its operating state, and for storing the stop incapability cause information affixed to the stop control frame, in the nonvolatile storage device together with information expressive of the detected control unit.

17. A network system according to claim 1, wherein
data in which various start causes are expressed in bit units are affixed to the start control frame as the start cause information.

18. A network system according to claim 17, wherein
a data length of the start cause information affixed to the start control frame is set for every control unit in accordance with the number of the start causes of the each control unit.

19. A network system according to claim 1, wherein
data in which various start causes are expressed by predetermined codes are affixed to the start control frame as the start cause information.

20. A network system according to claim 1, wherein
data which includes an area for expressing various start causes in bit units and an area for expressing the various start causes by codes are affixed to the start control frame as the start cause information.

* * * * *